United States Patent Office 3,721,188
Patented Mar. 20, 1973

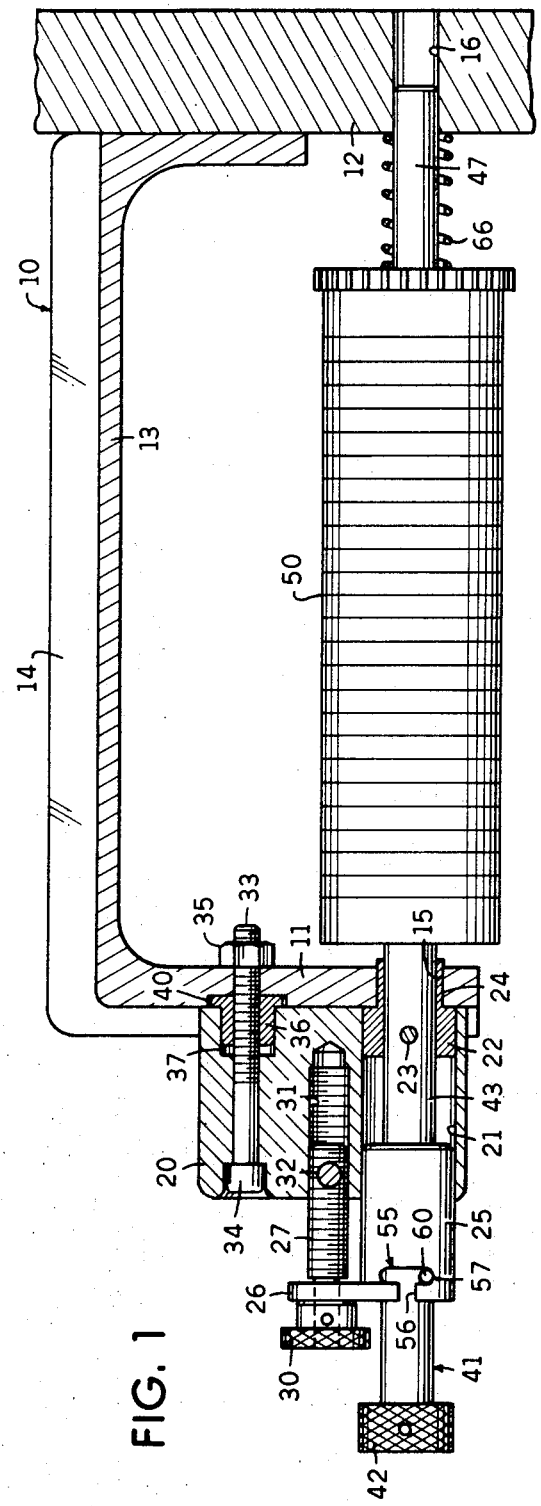

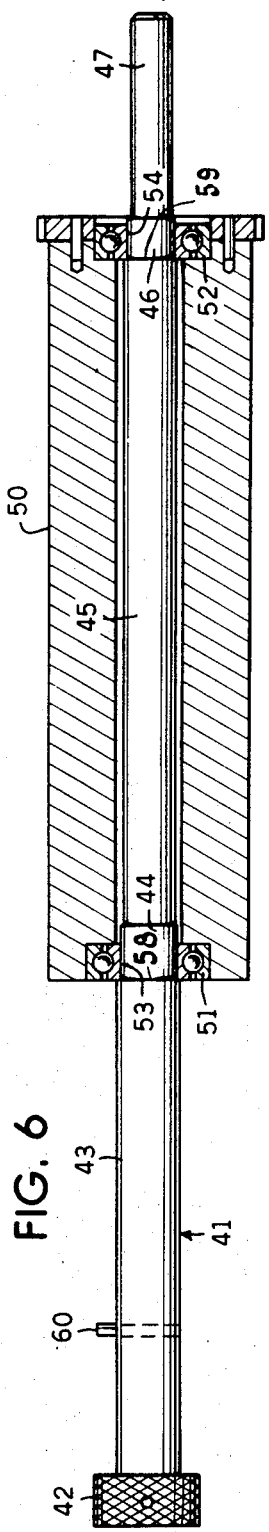
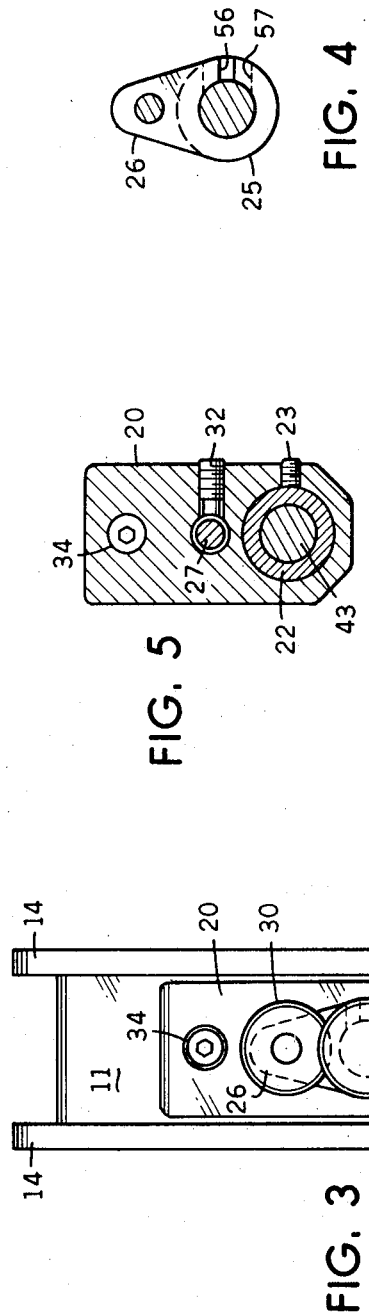
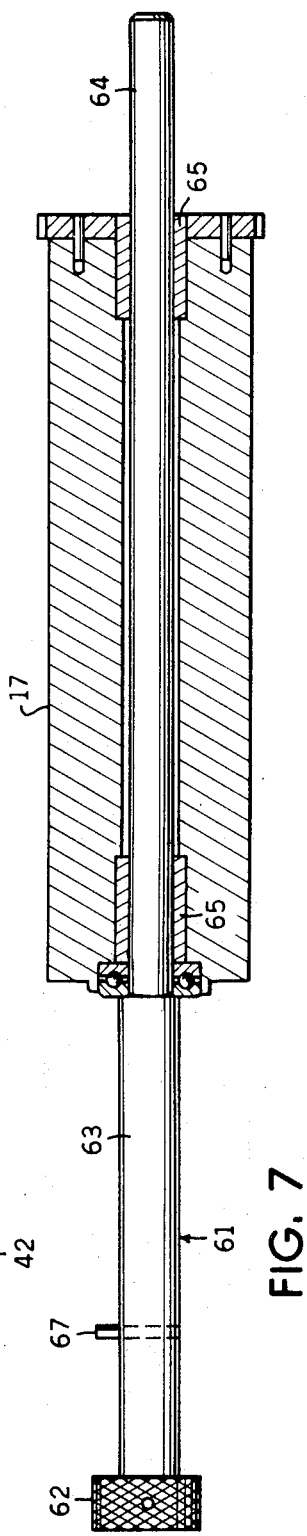

3,721,188
PRINTING CYLINDER ASSEMBLY
John C. Jacobsen, Town and Country, and John S. Wilson, Kirkwood, Mo., assignors to Allied Gear and Machine Co., Inc., St. Louis, Mo.
Filed Feb. 23, 1972, Ser. No. 228,689
Int. Cl. B41f 13/20, 13/44
U.S. Cl. 101—375
3 Claims

ABSTRACT OF THE DISCLOSURE

A printing cylinder assembly including a shaft having longitudinally and axially spaced first and second shoulder portions with an intermediate shaft portion therebetween, the second shoulder portion being located nearer to the shaft end, and the first shoulder portion being provided with a cross-sectional dimension larger than that of the second shoulder portion and intermediate shaft portion, and the second shoulder portion being provided with a cross-sectional dimension larger than the shaft end. The printing cylinder is provided with a longitudinal passage therethrough that receives the shaft. First and second ball bearings are carried by opposite ends of the cylinder with their rotative axes in longitudinal alignment, the outer races of the ball bearings being fixed to the cylinder. The inner race of the first ball bearing is provided with a cross-sectional dimension larger than that of the inner race of the second ball bearing and only slightly smaller than that of the first shoulder portion. The inner race of the second ball bearing is provided with a cross-sectional dimension only slightly smaller than that of the second shoulder portion yet larger than that of the shaft end, whereby the inner race of the first ball bearing will pass over the shaft end, second shoulder portion and intermediate shaft portion for a press-fit on the first shoulder portion. The inner race of the second ball bearing will pass over the shaft end for a press-fit on the second shoulder portion. The outer circumference of the cylinder is concentric with the longitudinally aligned rotative axes of the ball bearings to provide a precisely in-round cylinder diameter for accurate printing. The intermediate shaft portion has a cross-sectional dimension larger than the second shoulder portion to provide a stop abutment against which the inner race of the second ball bearing is positioned. The shaft has a portion adjacent to the first shoulder portion and on the opposite side of the first shoulder portion from the intermediate shaft portion to provide a stop abutment against which the inner race of the first ball bearing is positioned.

BACKGROUND OF THE INVENTION

This invention relates generally to improvements in a printing cylinder assembly, and more particularly to an improved mounting of a printing cylinder which facilitates assembly and disassembly and which increases printing accuracy.

In the conventional printing machines, the printing cylinders are mounted on shafts so as to rotate on the shaft surface. As a result, the peripheral diameter of the cylinder is slightly out-of-round when rotating. In any event, the accuracy leaves much to be desired.

SUMMARY OF THE INVENTION

The present printing cylinder assembly provides a mounting of the cylinder on the shaft which enables ready removal and replacement selectively of the cylinder simply by slipping the cylinder off and on respectively of one shaft end without requiring actual disassembly of the cylinder itself. Moreover, the improved mounting does not rely on the rotation of the cylinder on a shaft surface but rather on longitudinally aligned rotative axes of ball bearings which provide highly precise printing results.

In the present printing cylinder assembly, the shaft includes longitudinally and axially spaced first and second shoulder portions with an intermediate shaft portion therebetween, the second shoulder portion being located nearer to a shaft end, and the first shoulder portion being provided with a cross-sectional dimension larger than that of the second shoulder portion and the intermediate shaft portion, and the second shoulder portion being provided with a cross-sectional dimension larger than the shaft end. First and second ball bearings are carried at opposite ends of the printing cylinder with their rotative axes in longitudinal alignment, the outer races of the ball bearings being fixed to the cylinder. The inner race of the first ball bearing is provided with a cross-sectional dimension larger than that of the inner race of the second ball bearing and only slightly smaller than that of the first shoulder portion, and the inner race of the second ball bearing being provided with a cross-sectional dimension only slightly smaller than that of the second shoulder portion yet larger than that of the shaft end, whereby the inner race of the first ball bearing will pass over the shaft end, second shoulder portion and intermediate shaft portion for a press-fit on the first shoulder portion. The inner race of the second ball bearing will pass over the shaft end for a press-fit on the second shoulder portion.

The outer circumference of the printing cylinder is concentric with the longitudinally aligned rotative axes of the ball bearings to provide a precisely in-round cylinder diameter for accurate printing.

The intermediate shaft portion has a cross-sectional dimension larger than the second shoulder portion to provide a stop abutment against which the inner race of the second ball bearing is positioned. The shaft has a portion adjacent to the first shoulder portion and on the opposite side of the first shoulder portion from the intermediate shaft portion to provide a stop abutment against which the inner race of the first ball bearing is positioned.

BRIEF DESCRIPTION OF THE DRAWING

FIG. 1 is a cross-sectional view of the printing cylinder conversion unit mounted on a machine frame, the shaft and cylinder being located in one axially adjusted position;

FIG. 2 is a cross-sectional view, similar to FIG. 1, but showing the shaft and cylinder in another adjusted axial position;

FIG. 3 is an end elevational view as seen from the left of FIG. 1;

FIG. 4 is an end elevational view of the sleeve in which the printing shaft is mounted and carried;

FIG. 5 is a cross-sectional view taken on line 5—5 of FIG. 2;

FIG. 6 is a cross-sectional view of a special cylinder shaft and a special printing cylinder mounted on such shaft, and FIG. 7 is a side elevational view of a second special cylinder shaft utilized with the conversion unit on which the printing cylinder, provided as original equipment, can be mounted.

DESCRIPTION OF THE PREFERRED EMBODIMENT

The printing machine for which the printing cylinder conversion unit disclosed is especially adapted, is a flexographic press, Webtron 650 or Webtron Multiflex, although it will be understood that the unit can be adapted for other printing machines.

The printing machine includes a frame 10 having opposed and spaced frame members 11 and 12 interconnected by a bridge 13. The frame member 11 and bridge 13 are provided with a pair of outwardly extending and spaced flanges 14 for reinforcement. Each of the frame members 11 and 12 is provided with a shaft bore 15 and 16 that are axially aligned and adapted to receive and mount a cylinder shaft (not shown) provided as original equipment. The printing cylinder 17 (FIG. 7) provided as original equipment, is disposed between the frame members 11 and 12.

The printing cylinder conversion unit includes a body 20 located between the frame flanges 14 and against the frame member 11. The unit body 20 is provided with a bore 21 axially aligned with the shaft bores 15 and 16.

Located within the body bore 21 is a bearing fitting 22. A set screw 23 carried by the unit body 20 fixes the bearing fitting 22 to the body at one end of the bore 21. The bushing fitting 22 includes a reduced portion 24 that is fixed with an adhesive into the shaft bore 15, the bearing fitting 22 serving to fix the body 20 to the frame member 11.

An adjustable means, the purpose of which will be discussed upon later detailed description of parts, includes a cylindrical sleeve 25 slidably mounted in the body bore 21 and extending outwardly from one end of such bore. The sleeve 25 includes an integral, outstanding ear 26 that rotatably mounts a threaded element 27. A head 30, having a knurled surface, is attached to the outer end of the threaded element 27 to facilitate turning. The threaded element is threadedly received in a tapped bore 31 provided in the unit body 20. Upon turning the threaded element 27, the axial position of the sleeve 25 within the body bore 21 is selectively adjusted. A set screw 32, carried by the unit body 20, selectively engages and locks the threaded element 27 in the adjusted position.

A fastening means for assisting in clamping the body 20 to the frame member 11, includes a bolt 33 extending through the body 20 and the frame member 11. The bolt 33 includes a head 34 engageable with the body 20, and a nut 35 threadedly attached to the shank end of the bolt 33 and engageable with the frame member 11. A lock nut 36 is threadedly received by the bolt 33 and engageable with the rear side of the body 20 to hold the bolt 33 initially to the body 20 upon assembly of the unit to the frame member 11. The lock nut 36 includes a reduced portion movable into a body recess 37, and an enlarged head portion that interfits a compatible recess 40 provided in the frame member 11.

It will be understood that the bolt 33 and the bushing fitting 22 are axially spaced and provide a couple connecting the conversion unit to the frame member 11.

Slidably received within the bushing fitting 22 and mounted in the sleeve 25 is a special cylinder shaft 41. The special shaft 41 is provided with an enlarged head 42 at one end to facilitate manipulation. The special shaft 41 is perhaps best shown in FIG. 6. It includes a shank portion 43 having a diameter that closely interfits the sleeve 25 and the bushing fitting 22, a reduced first shoulder portion 44 of relatively short axial length, a further reduced shank portion 45 of relatively long axial length, a still further reduced second shoulder portion 46 of relatively short axial length, and a still further reduced end shank portion 47 adapted to be mounted in the shaft bore 16 of the frame member 12. The shaft portion 45 is intermediate the first and second shoulder portions 44 and 46.

A special printing cylinder 50 is provided for mounting on the special shaft 41. This special cylinder 50 provides a first ball bearing 51 carried at one end and a second ball bearing 52 carried by the opposite end. For reasons which will later appear, the diameter of the inner race 53 of ball bearing 51 is slightly greater than the diameter of the inner race 54 of the ball bearing 52. In fact, the diameter of ball bearing race 53 closely approximates, yet is slightly smaller than the diameter of the first shoulder portion 44, while the diameter of the ball bearing race 54 closely approximates yet is slightly smaller than the diameter of the second shoulder portion 46.

As the special printing cylinder 50 is slipped over the end of the shaft 41, the ball bearing 51 will clear the shaft portions 47, 46 and 45, and the ball bearing 52 will clear the end shaft portion 47. To mount the special cylinder 50 on the special shaft 41, the inner race 53 of ball bearing 51 is press-fitted on the shaft portion 44 and the inner race 54 of ball bearing 52 is press-fitted on the shaft portion 46. Because the diameter of shaft portion 43 is larger than that of the first shoulder portion 44, a stop abutment 58 is provided against which the inner race 53 of the first ball bearing 51 is positioned. Further, because the diameter of the intermediate shaft portion 45 is larger than that of the second shoulder portion 46, a stop abutment 59 is provided against which the inner race 54 of the second ball bearing 52 is positioned. The cylinder 50 will then rotate on the ball bearings 51 and 52 which define a precise axis of rotation, and hence the peripheral diameter of the special cylinder 50, which is concentric with such rotative axis; will be precisely in-round for accurate printing.

The sleeve 25 is provided with a detachable connection with the special shaft 41. This connection includes a slot generally indicated by 55 having a first portion 56 opening to the end of the sleeve 25 and extending substantially axially in the direction of the shaft axis, and a second portion 57 extending substantially transversely of the first slot portion 56. A pin 60 carried by the special shaft 41 selectively interfits the slot 55 to lock the special shaft 41 to the sleeve 25.

To connect the special shaft 41, the shaft 41 is inserted through sleeve 25, the pin 60 is moved into the slot portion 56, and then the special shaft 41 is turned slightly so as to move the pin 60 into the slot portion 57. Axial movement of the sleeve 25 will then cause axial movement of the special shaft 41 connected to the sleeve 25.

A second special cylinder shaft 61 is provided in the conversion unit, and is best illustrated in FIG. 7. This second special shaft 61 includes a head 62 to facilitate manipulation, and a shank portion 63 of the same diameter and axial length as the shank portion 43 of the first special shaft 41. This shank portion 63 also closely interfits and is received in the sleeve 25 and the bushing fitting 22. The second special shaft 61 includes a reduced shank portion 64 of constant diameter extending to the shank end. This second special shaft 61 is adapted to mount the printing cylinder 17 provided as original equipment in the printing machine. As is conventional, this original cylinder 17 includes end bushings 65 that engage and ride on the surface of the reduced shank portion 64. A spring 66 is slipped over the end of the reduced shank portion 64 and disposed between the cylinder 17 and the frame member 12, the spring 66 selectively maintaining the cylinder 17 in place. The same spring 66 is utilized with the first special shaft 41 shown in FIG. 6, to lock the special cylinder 50 in axial position. It will be understood that the end portion 47 of the first special shaft 41 is of the same diameter as the reduced shank portion 64 of the second special shaft 61.

The second special shaft 61 is provided with a retaining pin 67 that is adapted to coact with the slot 55 in the sleeve 25 in exactly the same manner as the pin 60 on the first special shaft 41.

It is thought that the usage and functional results of this conversion unit have become fully apparent from the foregoing detailed description of parts, but for completeness of disclosure, the installation and usage will be briefly described. It will be assumed that the printing machine has the original cylinder shaft and original printing cylinder 17 mounted on the machine frame 10 for operation. It will be further assumed that the operator desires to replace this original cylinder 17 with a special cylinder 50 for more accurate printing operation.

First, the original cylinder shaft is removed from its shaft bores 15 and 16 and the original cylinder 17 is removed from such shaft and stored for use at a later date if desired. A bushing (not shown) originally supplied in the shaft bore 15 is also removed. The unit body 20 is then located against the frame member 11 between the frame flanges 14. The reduced portion 24 of the bushing fitting 22 is pressed into the shaft bore 15, the bushing fitting 22 being fixed to the body by the set screw 23. In addition, the bolt 33, which has been fixed to the body 20 by the retaining nut 36 is inserted through a hole in the frame member 11, and nut 35 is affixed to the bolt 33 to clamp the body 20 to the frame member 11.

It will be assumed that the sleeve 25 is located in the body bore 21 and that the threaded element 27 is threadedly attached to the body 20 in the tapped hole 31.

The first special shaft 41 is inserted through the sleeve 25 and bushing fitting 22. Then, the special cylinder 50 is slipped on the end of the first special shaft 41, and the reduced end portion 47 is located in the associated shaft bore 16 in the frame member 11. The first special shaft 41 is moved axially inwardly until the pin 60 moves into and through the slot portion 56, at which time, the special shaft 41 is turned slightly to move the pin 60 into the slot portion 57 to connect the shaft 41 with the sleeve 25.

Then, the special cylinder 50 is located on the special shaft 41 so that the inner races 53 and 54 of the respective ball bearings 51 and 52 are press-fitted on the respective shank portions 44 and 46. By turning the threaded element 27, the axial position of the sleeve 25 can be adjusted within the body bore 21, and consequently, the axial position of the special shaft 41 and the special cylinder 50 mounted on the shaft 41 can be adjusted also. FIG. 1 shows an adjustment of the special shaft 41 and the special cylinder 50 toward the left of its mounting frame, while FIG. 2 shows an adjustment toward the right.

If it is desired to replace the special cylinder 50 with another special cylinder carrying different printing plates, the first special shaft 41 is partially withdrawn by twisting the shaft until the pin 60 moves out of the slot portion 57, and then partially withdrawing the shaft 41 as the pin 60 moves outwardly through the slot portion 56. When the special shaft 41 has been withdrawn sufficiently, the special cylinder 50 can be slipped off of the shaft end, and another special cylinder can be mounted in the manner previously described.

As will be understood, the operator of the printing machine will have a collection of cylinders 17 which have been provided originally, these cylinders 17 mounting printing plates that are used for more than one printing operation. It is advantageous for the operator to use these original printing cylinders 17 when the need arises, and the present conversion unit permits this usage.

For example, the first special shaft 41 is removed by disconnecting the pin 60 from the sleeve 25 and withdrawing the shaft 41 completely, and at the same time removing the special cylinders 50 from such shaft 41. Then, the second special shaft 61 is inserted into the sleeve 25 and bushing fitting 22, and the desired original cylinder 17 is slipped over the shaft end. The second special shaft 61 is then completely inserted so that the shaft end is located in the shaft bore 16 of the frame member 12, and the pin 67 is operatively located in the slot 55. The original cylinder 17 is then located accurately on the shaft portion 64 and held in position by the spring 66. The bushings 65 carried by the original cylinder 17 will ride on the shaft portion 64.

The cylinder 25 and the bushing fitting 22 of the conversion unit mount this second special shaft 61 in the same manner as the first special shaft 41 is mounted. Furthermore, the second special shaft 61 is connected to and carried by the sleeve 25 through the pin and slot connection 67 and 55 in the same manner as the pin and slot connection 60 and 55 provided for the first special shaft 41. Axial adjustment of the sleeve 25 in the body bore 20 by manipulation of the threaded element 27 will provide axial adjustment of the position of the second shaft 61 and of the original cylinder 17 mounted on such shaft.

Of course, this original cylinder 17 can be as easily removed and replaced with other original cylinders or the second special shaft 61 and original cylinder 17 can be removed and the first special shaft 41 with its special cylinders 50 replaced.

We claim as our invention:

1. A printing cylinder assembly, comprising:
   (a) a shaft having a longitudinally and axially spaced first and second shoulder portions with an intermediate shaft portion therebetween, the second shoulder portion being located nearer to a shaft end, and the first shoulder portion being provided with a cross-sectional dimension larger than that of the second shoulder portion and the intermediate shaft portion, and the second shoulder portion being provided with a cross-sectional dimension larger than the said shaft end,
   (b) a printing cylinder having a longitudinal passage therethrough that receives the shaft,
   (c) a first ball bearing having its outer race fixed to the cylinder substantially at one end of the cylinder,
   (d) a second ball bearing having its outer race fixed to the cylinder substantially at the opposite end of the cylinder,
   (e) the first and second ball bearings having their rotative axes in longitudinal alignment, and
   (f) the inner race of the first ball bearing being provided with a cross-sectional dimension larger than that of the inner race of the second ball bearing and only slightly smaller than that of the first shoulder portion, and the inner race of the second ball bearing being provided with a cross-sectional dimension only slightly smaller than that of the second shoulder portion yet larger than that of said shaft end, whereby the inner race of the first ball bearing will pass over the said shaft end, second shoulder portion and intermediate shaft portion for a press-fit on the first shoulder portion, and the inner race of the second ball bearing will pass over the said shaft end for a press-fit on the second shoulder portion.

2. A printing cylinder assembly as defined in claim 1, in which:
   (g) the outer circumference of the cylinder is concentric with the longitudinally aligned rotative axes of the ball bearings to provide a precisely in-round cylinder diameter for accurate printing.

3. A printing cylinder assembly as defined in claim 1, in which:
   (g) the intermediate shaft portion has a cross-sectional dimension larger than the second shoulder portion to provide a stop abutment against which the inner race of the second ball bearing is positioned, and (h) the shaft has a portion adjacent to the first shoulder portion and on the opposite side of the first shoulder portion from the intermediate shaft portion to provide a stop abutment against which the inner race of the first ball bearing is positioned.

References Cited

UNITED STATES PATENTS

| | | | |
|---|---|---|---|
| 1,882,480 | 10/1932 | Brueshaber | 29—116 R |
| 2,425,529 | 8/1947 | Harless | 29—116 R |
| 2,637,270 | 5/1953 | Bramford | 101—357 |
| 2,716,780 | 9/1955 | Swanson | 29—116 R |
| 2,779,964 | 2/1957 | More | 29—116 R |
| 2,812,554 | 11/1957 | Swanson | 29—116 R |
| 2,817,940 | 12/1957 | Lovig | 29—116 R |
| 2,929,322 | 3/1960 | Bryer | 101—37 S |
| 3,167,010 | 1/1965 | Worthington | 101—349 |
| 3,590,452 | 7/1971 | Macleod | 101—37 S |

WILLIAM B. PENN, Primary Examiner

W. PIEPRZ, Assistant Examiner

U.S. Cl. X.R.

29—116 R